US011892133B2

(12) United States Patent
Gromfeld et al.

(10) Patent No.: US 11,892,133 B2
(45) **Date of Patent: *Feb. 6, 2024**

(54) LIGHTING SYSTEM FOR MOTOR VEHICLE HEADLIGHT

(71) Applicant: Valeo Vision, Bobigny (FR)

(72) Inventors: Yves Gromfeld, Angers (FR); Maxime Laminette, Angers (FR); Sylvain Giraud, La Fleche (FR); Jean-Francois Doha, Saint Barthelemy d'Anjou (FR)

(73) Assignee: Valeo Vision, Bobigny (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,390

(22) Filed: Oct. 18, 2021

(65) Prior Publication Data

US 2022/0049829 A1 Feb. 17, 2022

Related U.S. Application Data

(63) Continuation of application No. 16/198,535, filed on Nov. 21, 2018, now Pat. No. 11,156,333, which is a (Continued)

(30) Foreign Application Priority Data

Jul. 28, 2015 (FR) ...................................... 1557182

(51) Int. Cl.
*F21S 41/143* (2018.01)
*F21S 41/265* (2018.01)
(Continued)

(52) U.S. Cl.
CPC ........... *F21S 41/143* (2018.01); *F21S 41/151* (2018.01); *F21S 41/26* (2018.01); *F21S 41/265* (2018.01);
(Continued)

(58) Field of Classification Search
CPC ........ F21S 41/143; F21S 41/151; F21S 41/26; F21S 41/265; F21S 41/27; F21S 41/28;
(Continued)

(56) References Cited

U.S. PATENT DOCUMENTS 5,070,432 A 12/1991 Kitazumi
5,490,048 A * 2/1996 Brassier ................. B60Q 1/302 362/546
(Continued)

FOREIGN PATENT DOCUMENTS

DE 102012009596 A1 11/2013
EP 1903275 A1 3/2008
(Continued)

*Primary Examiner* — Matthew Mikels
(74) *Attorney, Agent, or Firm* — Oblon, McClelland, Maier & Neustadt, L.L.P.

(57) ABSTRACT

A lighting system for a motor vehicle comprising at least one primary optical device for emitting a light beam exhibiting a cutoff profile, the primary optical emission device comprising at least one light source and one single-piece primary optical member comprising an input surface suitable for receiving a light beam emitted by the light source, a ray interception surface configured to form the cutoff profile in the light beam received and an output surface for the light beam.

This system also comprises a projection device arranged downstream of the primary optical emission device(s) and comprising an input surface arranged facing the primary optical emission device(s), and through which are introduced rays of the light beam derived as output from the primary optical emission device(s) a single continuous output surface through which the light beam is projected.

11 Claims, 5 Drawing Sheets

Related U.S. Application Data continuation of application No. 15/219,778, filed on Jul. 26, 2016, now Pat. No. 10,151,437.

(51) Int. Cl.

| | |
|---|---|
| ***F21S 41/20*** | (2018.01) |
| ***F21S 41/26*** | (2018.01) |
| ***F21S 41/27*** | (2018.01) |
| ***F21S 41/32*** | (2018.01) |
| ***F21S 41/43*** | (2018.01) |
| ***F21S 41/663*** | (2018.01) |
| ***F21S 41/151*** | (2018.01) |
| ***F21S 45/47*** | (2018.01) |

(52) U.S. Cl.

CPC ............... *F21S 41/27* (2018.01); *F21S 41/28* (2018.01); *F21S 41/322* (2018.01); *F21S 41/43* (2018.01); *F21S 41/663* (2018.01); *F21S 45/47* (2018.01)

(58) Field of Classification Search

CPC ........ F21S 41/322; F21S 41/43; F21S 41/663; F21S 45/47; F21S 41/24; F21S 41/25; F21S 41/255; F21S 41/30; F21W 2102/00; F21W 5/04; F21W 7/00

See application file for complete search history.

(56) References Cited

U.S. PATENT DOCUMENTS

| | | | | |
|---|---|---|---|---|
| 7,810,975 | B2 | 10/2010 | Specht et al. | |
| 9,316,374 | B2 | 4/2016 | Owada et al. | |
| 9,400,089 | B2 | 7/2016 | Nakaya | |
| 9,447,939 | B2 | 9/2016 | Wintzer et al. | |
| 10,151,437 | B2 * | 12/2018 | Gromfeld | F21S 41/143 |
| 11,156,333 | B2 * | 10/2021 | Gromfeld | F21S 41/43 |
| 2004/0156209 | A1 | 8/2004 | Ishida | |
| 2008/0025036 | A1 * | 1/2008 | Takada | F21S 41/365 362/523 |
| 2008/0080207 | A1 | 4/2008 | Specht et al. | |
| 2009/0122567 | A1 * | 5/2009 | Mochizuki | F21S 41/365 362/509 |
| 2010/0124069 | A1 | 5/2010 | Nomura | |
| 2010/0309679 | A1 | 12/2010 | Yamagata | |
| 2014/0233253 | A1 | 8/2014 | Owada et al. | |
| 2014/0362596 | A1 | 12/2014 | Nakaya | |
| 2015/0109810 | A1 | 4/2015 | Wintzer et al. | |

FOREIGN PATENT DOCUMENTS

| | | | |
|---|---|---|---|
| EP | 2767750 | A1 | 8/2014 |
| EP | 2818792 | A1 | 12/2014 |
| FR | 3010772 | A1 | 3/2015 |

* cited by examiner

LIGHTING SYSTEM FOR MOTOR VEHICLE HEADLIGHT

CROSS-REFERENCE TO RELATED APPLICATIONS

This application is a is a continuation of U.S. application Ser. No. 16/198,535 filed Nov. 21, 2018, which is a continuation of U.S. application Ser. No. 15/219,778 filed Jul. 26, 2016, which claims priority to French Application No. 1557182 filed Jul. 28, 2015, which application is incorporated herein by reference and made a part hereof.

BACKGROUND OF THE INVENTION

1. Field of the Invention

The present invention relates to a lighting system.

A preferred application relates to the motor vehicle industry for the production of signaling and/or lighting devices, notably vehicle headlights.

In the latter field, lighting modules or headlights are known, among which there are, traditionally, low or dipped beams, of a range on the road in the region of 70 meters, which are used mainly at night and of which the distribution of the light beam is such that it makes it possible not to dazzle the driver of an oncoming vehicle. Typically, this beam has a cutoff in the upper part with a horizontal portion, preferentially approximately 0.57 degrees below the horizon, in order to not illuminate the zone in which the driver of a vehicle arriving in the opposite direction ought to be located.

In this field, there are also high beams, and fog lamps both having a beam with cutoff.

2. Description of the Related Art

The publication FR3010772 falls within the framework of this technology by forming a light emission device which generates a beam with a cutoff profile, this device comprising:

- a light source;
- a primary optical member for propagating light rays, formed from a solid single piece and comprising: an input portion through which are introduced, into the primary optical member, rays deriving from the light source, and an output portion through which the output light beam is projected;
- a ray interception surface configured to form the cutoff profile, and consisting of a wall of the primary optical member situated in an intermediate portion of the primary optical member between the input portion and the output portion along the optical axis.

Several of these light emission devices are generally aligned horizontally at the level of an optical block at the front of a vehicle, then forming a lighting system.

The output portions of the different devices can thus be seen from the front of a vehicle, through the outer lens of the optical block. These output portions each consist of a surface of spherical appearance or a surface corresponding to a toroidal portion for example. They are offset relative to one another, by being more or less close to the outer lens, according to the positioning and electrical connection possibilities of the devices in the space available within the optical block.

Now, the new trend is to have increasingly compact lighting systems with output surfaces that follow the curved profile of the outer lenses.

For a conventional lighting system arrangement, with the devices offset and the different forms of output portions, the output surface thus formed by the plurality of output portions is relatively unattractive and does not make it possible to retain the continuity in curvature of the corresponding outer lens.

The objective of the invention is thus to propose a lighting system of which the output surface is curved and follows the profile of the outer lens placed downstream.

SUMMARY OF THE INVENTION

The present invention thus relates to a lighting system for a motor vehicle comprising at least one primary optical device for emitting a light beam exhibiting a cutoff profile, the primary optical emission device comprising at least one light source and one single-piece primary optical member comprising an input surface suitable for receiving a light beam emitted by the light source, a ray interception surface configured to form the cutoff profile in the light beam received and an output surface 8 for the light beam.

It can be a flat, horizontal or even oblique cutoff profile. As a variant, it can be a cutoff profile comprising two flat cutoff portions forming an angle between them, for example of 15°.

Advantageously, the primary optical member is produced in a material suitable for allowing the propagation of the light beam within it, from the input surface to the output surface by total internal reflections on the internal walls of the primary optical member.

Primarily, this lighting system is characterized in that it also comprises a projection device arranged downstream of the primary optical emission device(s) and comprising:

- an input surface arranged facing the primary optical emission device(s), and through which are introduced rays of the light beam derived as output from the primary optical emission device(s);
- a single continuous output surface through which the light beam is projected.

The invention thus makes it possible to create an LED beam projected to infinity, by using only two optical devices, namely a primary optical emission device whose function consists in producing a cutoff profile, and a projection device whose functions are to return the beam to infinity and to have a curved and attractive output surface. Thus, the unattractive primary optical emission device will not be visible through the outer lens, and only the output surface of the projection device will be visible.

Each primary optical emission device contains, for example, a refractive folding device making it possible to produce the cutoff profile, like that described in the publication FR3010772. All the rays emitted by the light source of the emission device are focused on this refractive folding device, which then reflects these rays toward an output surface of the primary optical emission device.

These rays are divergent at the output of the primary optical emission device and arrive on the projection device which will collimate all the rays to infinity.

The projection device is common to all the primary optical emission devices, and therefore has a single curved output surface, making it possible to address the technical issue raised.

In concrete terms, the projection device consists of a projection lens.

The primary optical member comprises an input portion comprising the input face and arranged to form a primary image of the light source on the interception surface.

According to a possible configuration, the input face of the primary optical member, through which the rays deriving from the source penetrate, has a cavity form. This cavity has a surface part that is convex toward a first focal point where the source is situated and advantageously symmetrical of revolution on the optical axis of the primary optical member. This convex surface is surrounded by a surface of concave orientation, also of revolution on the optical axis of the primary optical member. The concave surface is preferentially spherical with a center that coincides with the first focal point where the source is situated.

For example, the input portion is arranged to concentrate, for example by reflections, the received light beam at a second focal point arranged at an edge of the interception surface. The primary image is in this case a real image of the light source. The input portion can for example be a concentration collimator. As a variant, the input portion can comprise a wall of ellipsoidal profile.

More specifically, the primary optical member comprises an intermediate portion, advantageously extending along its optical axis like the input portion. It nevertheless comprises a geometric break zone revealed by a hollowed zone.

This zone forms a relief in the form of a cavity toward the core of the primary optical member, toward its optical axis.

This hollowed zone can take various forms. Globally, it can be, seen in vertical cross section, a notch defined by the faces of a dihedron forming an angle whose vertex is directed toward the interior of the intermediate zone and constitutes a peak corresponding to the location of secondary focal points. This peak is therefore the portion of space where the rays interfere with the hollowed zone.

This interference part forms the interception surface making it possible to create a cutoff profile. The interception surface is at the interface with the environment surrounding the primary optical member, such as air, so that a diopter is produced at this level.

The rays deriving from the source are directed by the input portion so as to converge toward the location of secondary focal points situated on the interception surface.

According to a possible configuration, the concentration of rays can be done in a quasi-spot zone, which means that the input portion concentrates the reflected rays at a point or in a small zone of the space around a median point regardless of the location of the reflection on the wall. The location of the secondary focal points will then be formed according to a focusing point.

According to another possible configuration, the location of the secondary focal points can even be formed on a focusing line. In this situation, all the rays emitted from a point of the source and contained in a vertical plane passing through this point are focused at a point of the location of focal points and the rays emitted by the point of the source and contained in a non-vertical plane passing through this point are reflected in mutually parallel directions.

Thus, at the location of secondary focal points, the form of the interception surface and the focusing adopted determine the cutoff.

The primary optical member finally comprises an output portion comprising the output face and arranged to form a secondary image of the primary image, the projection device being arranged to project the secondary image.

This output portion is arranged to form a virtual secondary image of the primary image at a third focal point or on a line of third focal points. If necessary, the projection device has a focal point or a line of focal points coinciding with the third focal point or the line of third focal points. Possibly, the secondary image can be situated upstream or downstream of the output face of the primary optical member.

Other optional and nonlimiting features are given hereinbelow:

- From the output surface of the projection lens, all the light rays originating from the primary optical emission device(s) are oriented parallel to one another in a single direction parallel to the optical axis X of the system.
- The input surface of the projection lens is continuous.
- The lighting system comprises at least two primary optical emission devices each comprising a light source and a primary optical member.
- The primary optical emission devices are arranged on a same horizontal plane and share a same line of focusing of the light rays on the ray interception surfaces configured to form the cutoff profile.
- The input surface of the projection lens is discontinuous and is divided into several portions linked to one another, each portion being adapted to and situated downstream of a primary optical emission device.
- The primary optical emission devices and the projection device are formed in a single-piece assembly.

Another subject of the invention consists of a vehicle equipped with at least one lighting system as described above.

These and other objects and advantages of the invention will be apparent from the following description, the accompanying drawings and the appended claims.

BRIEF DESCRIPTION OF THE ACCOMPANYING DRAWINGS

The invention will be better understood, and other aims, details, features and advantages thereof will become more clearly apparent, from the following detailed explanatory description of at least one embodiment of the invention, given by way of purely illustrative and nonlimiting example, with reference to the attached schematic drawings.

Figure 10A:
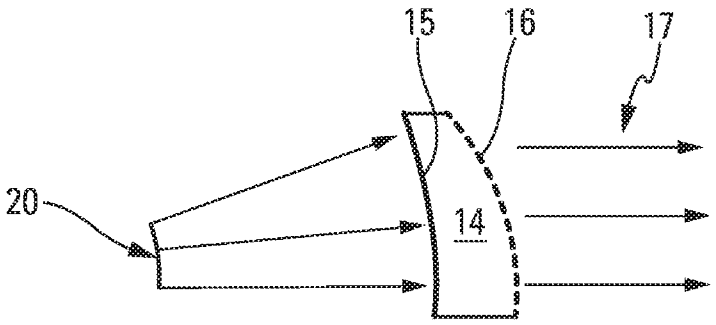
Figure 10B:
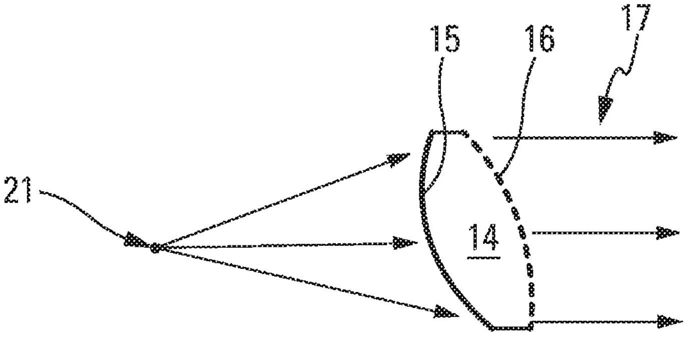
Figure 11:
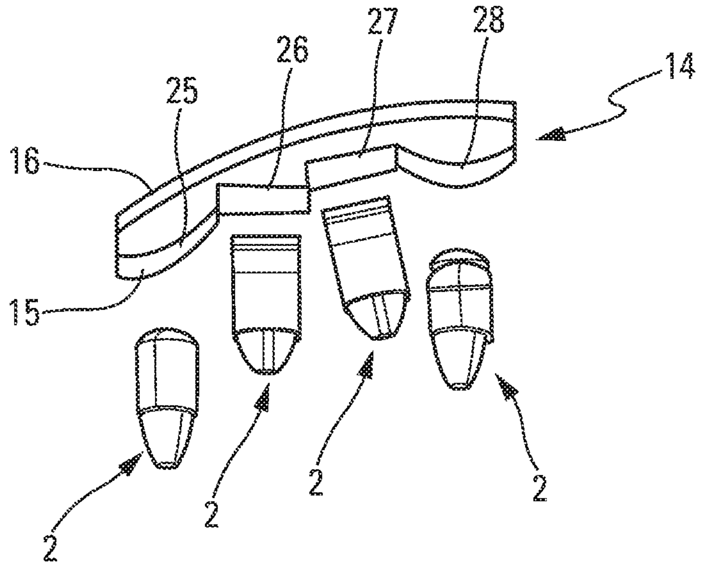
Figure 12:
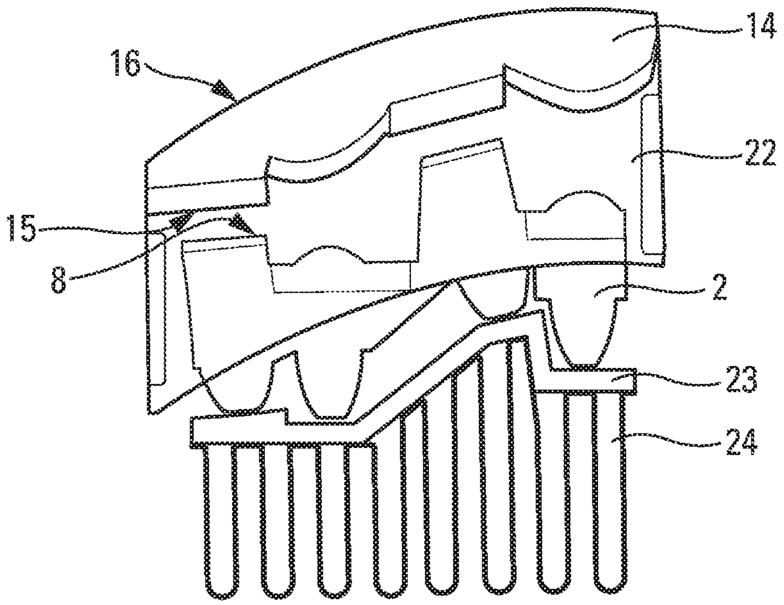

FIGS. 10*a* and 10*b* show two examples of input surface form of the projection lens;

FIG. 11 illustrates, in plan view, an example of a discontinuous input surface of the projection lens; and FIG. 12 illustrates, in plan view, an example of integration of the lighting system in a lighting module with a heat sink and an electronic board.

DETAILED DESCRIPTION OF THE PREFERRED EMBODIMENTS

The terms "vertical" and "horizontal" are used in the present description to denote directions, notably beam cutoff directions, according to an orientation at right angles to the plane of the horizon for the term "vertical", and according to an orientation parallel to the plane of the horizon for the term "horizontal". They should be considered in the conditions of operation of the device in a vehicle. The use of these words does not mean that slight variations around the vertical and horizontal directions are excluded from the invention. For example, a tilt relative to these directions of the order of + or −10° is here considered as a minor variation around the two preferred directions.

The term "parallel" or the concept of coinciding axes is used here notably with the manufacturing or assembly tolerances; substantially parallel directions or substantially coinciding axes fall within this scope.

The cutoffs produced by the system of the invention can moreover have any orientation in space.

The cutoff profile preferentially concerns the formation of an output beam non-uniformly distributed around the optical axis because of the presence of a zone of lesser light exposure, this zone being substantially delimited by a cutoff profile which can be flat or oblique.

The case represented in the different figures is particularly suited to installation in a headlight at the front of a motor vehicle.

Figure 1:
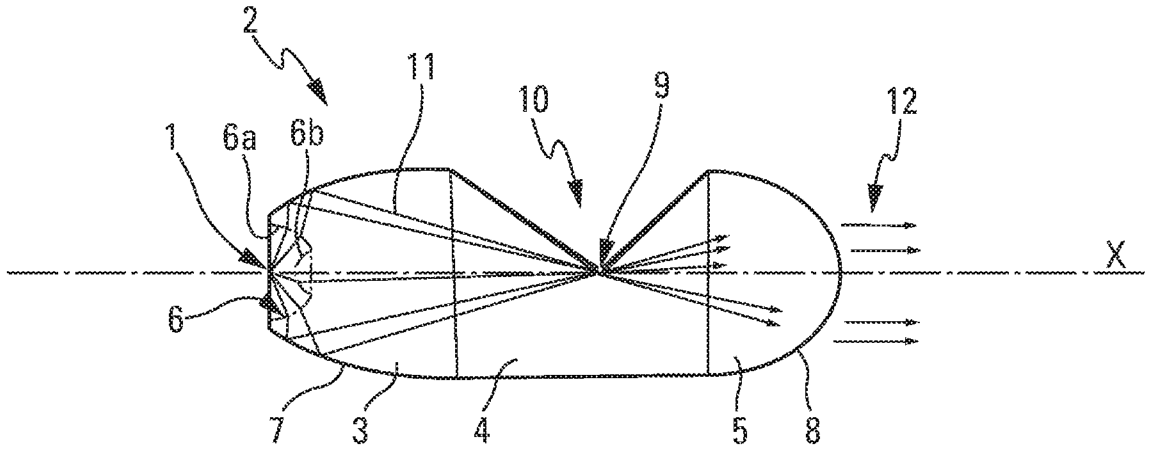
FIG. 1 is a cross-sectional view along a vertical plane passing through the optical axis of an exemplary embodiment of a lighting system according to the prior art.

Referring to FIG. 1 corresponding to an illustration of an example from the prior art, the lighting system comprises a light source 1 configured to emit light rays with a mean direction oriented according to an axis coinciding with an optical axis X of the system.

The light source 1 can consist of one or more sources and more particularly of one or more light-emitting diodes (LED). In the case of a plurality of diodes (LED), it is advantageous for them to be positioned in a same plane. The LEDs emit substantially in a half-space limited by their plane of installation, and the mean direction of emission is typically at right angles to the plane of the LED.

In the case of the example represented, the light source 1 consists of a single LED. The light source 1 cooperates with a primary optical member or emission device 2 with a form of ovoid appearance. There are other variant forms possible for the primary optical member 2.

Generally, the primary optical member 2 first of all comprises an input portion 3. The latter includes a face 6 through which the rays 11 deriving from the light source 1 penetrate. The face 6 has a cavity form so as to produce an optical member whose focal point receives the light source 1. The cavity has a surface part **6*b* that is convex toward the focal point where the light source 1 is situated and advantageously symmetrical of revolution on the optical axis. The surface part 6*b* is surrounded by a surface 6*a*, also of revolution on the optical axis X and of concave orientation. The surface 6*a* is preferably spherical with a center coinciding with the first focal point where the light source 1 is situated. Entering through the duly defined face 6, the rays 11 are propagated in the input portion 3 and are kept in the primary optical member 2 by reflection on the peripheral wall 7 of the input portion 3. The latter has a refractive function to apply a redirection of the rays 11 toward an intermediate portion 4 of the primary optical member 2 where a cutoff occurs, before exiting through an output portion 5**.

More specifically, the peripheral wall 7 of the input portion 3 is configured to concentrate the reflected rays 11 toward a location or line of focusing 9, here also called location of secondary focal points 9. The wall 7 is constructed as a result of the desired focusing.

The intermediate portion 4 advantageously extends along the optical axis X like the input portion 3. It nevertheless includes a geometric break zone revealed by the hollowed zone 10.

This hollowed zone 10 forms a relief in cavity form toward the core of the primary optical member 2, toward the optical axis X.

This hollowed zone 10 can take various forms. Globally, it can be, seen in vertical cross section, a notch defined by the faces of a dihedron forming an angle whose vertex is directed toward the interior of the intermediate zone 4 and constitutes a peak corresponding to the location of secondary focal points 9. This peak is therefore the portion of space where the rays 11 interfere with the hollowed zone 10.

This interference part forms the interception surface making it possible to create a cutoff profile. The interception surface is at the interface with the environment surrounding the primary optical member 2, such as air, so that a diopter is produced at this level.

The rays 11 deriving from the light source 1 are directed by the input portion 3 so as to converge toward the location of secondary focal points 9 situated on the interception surface.

According to a possible configuration, the concentration of rays 11 can be done in a quasi-spot zone, which means that the input portion 3 concentrates the reflected rays 11 at a point or in a small zone of the space around a median point regardless of the location of the reflection on the wall 7. The location of the secondary focal points 9 will then be formed according to a focusing point.

According to another possible configuration, the location of the secondary focal points 9 can even be formed along a focusing line. In this situation, all the rays 11 emitted from a point of the light source 1 and contained in a vertical plane passing through this point are focused at a point of the location of focal points 9 and the rays 11 emitted by the point of the light source 1 and contained in a non-vertical plane passing through this point are reflected in mutually parallel directions.

Thus, at the location of secondary focal points 9, the form of the interception surface and the focusing adopted determine the cutoff.

The rays 11 which are not intercepted by the interception surface are propagated toward the output portion 5 of the primary optical member 2. The latter output portion 5 acts as projection lens and delivers the output beam 12 through an output surface 8. This output beam 12 is made up of rays 11 that are parallel to one another both in a vertical plane (as can be seen in FIG. 1) and in a horizontal plane. The output beam 12 is thus directed to infinity by virtue of the projection lens. This output surface 8 is positioned just upstream of a transparent protective outer lens of the lighting system, and is therefore visible through this outer lens.

Figure 2:
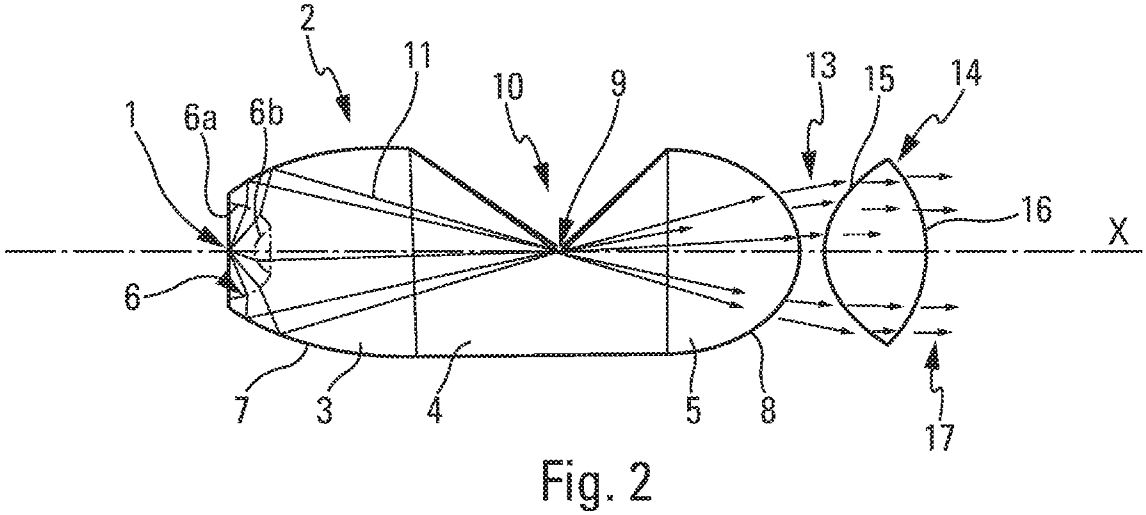
FIG. 2 is a cross-sectional view along a vertical plane passing through the optical axis of an exemplary embodiment of a lighting system according to the invention.

FIG. 2 corresponds to a possible configuration of the present invention. It uses the same lighting system as FIG. 1, as described above, with a modified output portion 5, and with the addition of a second primary optical member 14 downstream of the first primary optical member 2 and upstream of the protective outer lens (not represented in this figure).

In effect, the output portion 5 is modified in that the output surface 8 now consists of a concentration lens which slightly deflects the rays 11 so as to concentrate them. In this example, its concentration power is strong horizontally and weak vertically. Thus, the beam 13 at the output of the first primary optical member 2 is no longer directed toward infinity, but is divergent as is shown in FIG. 2.

This divergent beam 13 then passes through a second primary optical member 14 which corresponds to a projection lens 14 and which delivers an output beam 17 directed toward infinity. This lens comprises an input surface 15 and an output surface 16.

The lighting system according to the invention thus comprises a device for emitting a light beam with a cutoff profile, corresponding to the first primary optical member 2, and a device for projecting the light beam to infinity corresponding to the second primary optical member 14.

The surface visible through the protective outer lens of the lighting system is no longer the output surface 8 of the first primary optical member 2, but the output surface 16 of the second primary optical member 14, that is to say the output surface 16 of the projection device 14. For greater clarity, the term projection lens 14 will be used hereinafter in the description.

The advantage provided by this solution over that of the prior art is that it is possible to have the output surface 16 of the projection lens 14 take the desired form, so that it closely follows the curved and continuous form of the protective outer lens. Thus, instead of having a hemispherical form or a toroidal portion form visible conventionally behind the outer lens with an offset relative to the profile of the outer lens, it will be a form similar to that of the outer lens which will be visible through the latter.

Figure 3:
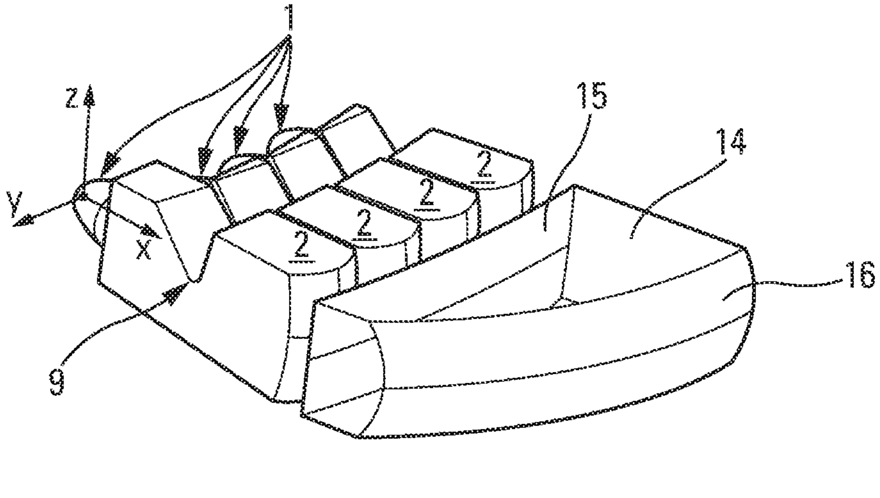
FIG. 3 shows a perspective illustration of the lighting system of the invention, according to the example of FIG. 2.

That is all the more advantageous when the lighting system comprises several aligned emission devices 2. In effect, the lighting system according to the invention can comprise one or more emission devices 2 for emitting a light beam, but only ever comprises a single projection lens 14, as is illustrated in FIG. 3. Thus, there is only ever a single output surface 16 visible through the outer lens, and not several output surfaces 16 visible with several different forms, creating an unattractive waviness behind the outer lens, as in the prior art.

FIG. 3, as it happens, shows four emission devices 2 and one projection lens 14. In FIG. 3, the axes x, y and z are identified in order to be able to better define the orientations of the planes and of the rays 11 hereinafter in the description. The axes x and y are situated in a plane of horizontal appearance and the axis z is situated in a plane of vertical appearance.

In the example presented, the emission devices 2 are arranged on a same horizontal plane and share a same line of focusing 9 of the light rays 11 on a ray interception surface configured to form the cutoff profile. These emission devices 2 work simultaneously to create a high beam.

Turning the emission devices 2 over 180° vertically makes it possible to create a fog lamp.

Figure 4:
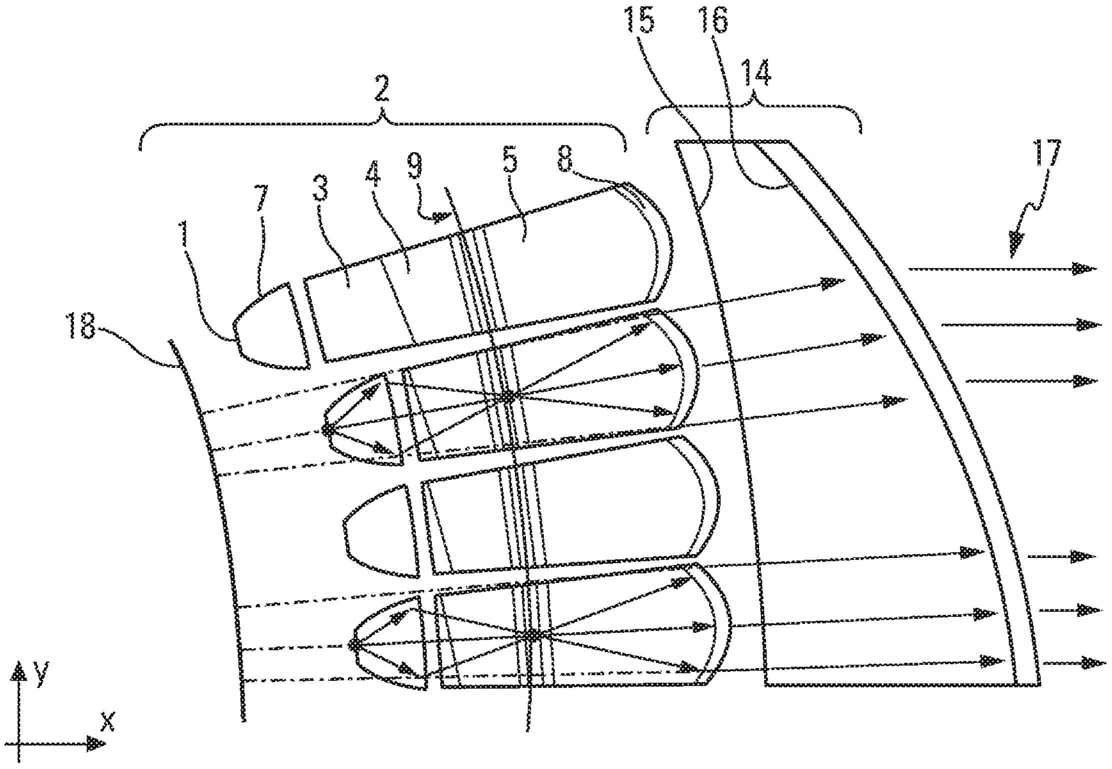
FIG. 4 shows the lighting system of the invention with the schematic representation of the propagation of a few light rays in a horizontal plane.

FIG. 4 shows the path of the light rays through the lighting system according to FIG. 3, in a horizontal plane.

The rays leave the four light sources 1, are reflected on the walls 7, are focused on interception surfaces at the location of secondary focal points 9, then are directed toward the output surfaces 8 of the emission devices 2. As stated previously, the output surfaces 8 have a concentration lens function, with a relatively strong horizontal power, making it possible to concentrate the rays of a same beam almost parallel to one another in the direction of the optical axis $E_x$ of the corresponding emission device 2 (see FIG. 6).

The four beams leaving the four emission devices 2 are obviously not parallel to one another.

They then reach the input surface 15 of the projection lens 14. This input surface 15 has a weak horizontal power and therefore deflects the rays only very slightly. The four beams finally reach the output surface 16 of the projection lens 14 which reorients all the rays of all the beams parallel in a same direction parallel to the direction of the general optical axis X of the lighting system (see FIG. 6).

Figure 5:
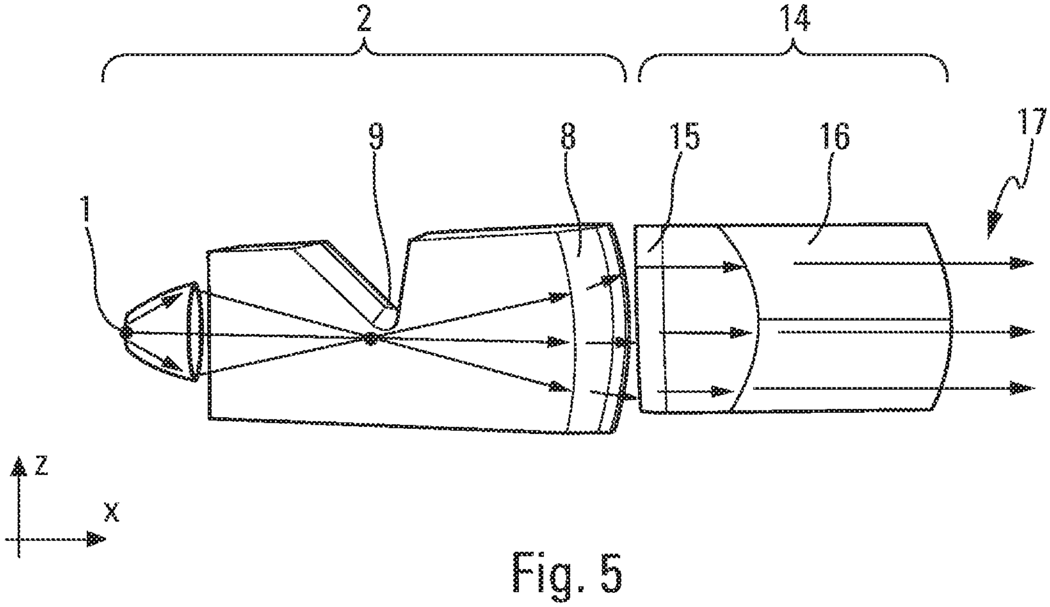
FIG. 5 shows the lighting system of the invention with the schematic representation of the propagation of a few light rays in a vertical plane.

FIG. 5 shows the path of the light rays through the lighting system according to FIG. 3, in a vertical plane.

The rays leave the four light sources 1, are reflected on the walls 7, are focused on interception surfaces at the location of secondary focal points 9, then are directed toward the output surfaces 8 of the emission devices 2. As stated previously, the output surfaces 8 consist of concentration lenses which have only a weak vertical power and which deflect the rays only very slightly. The four beams leaving the four emission devices 2 are therefore made up of vertically divergent rays. They then reach the input surface 15 of the projection lens 14. This input surface 15 reorients all the rays of all the beams almost parallel in a same direction parallel to the direction of the general optical axis X of the lighting system. The four beams finally reach the output surface 16 whose vertical power is weak, but sufficient to ensure that all the rays of all the beams are oriented perfectly parallel to the general optical axis X.

At the end of the different trajectories taken by the rays, both in a horizontal plane and in a vertical plane, beams 17 that are parallel to one another and directed toward infinity in a same direction thus leave the lighting system.

As is illustrated in FIG. 4, all the rays of the beams arriving on the projection lens 14 are derived from a virtual focal length curve 18 situated upstream of the emission devices 2. The different emission devices 2 thus share a same virtual focal point line 18 to create the general optical system.

Figure 6:
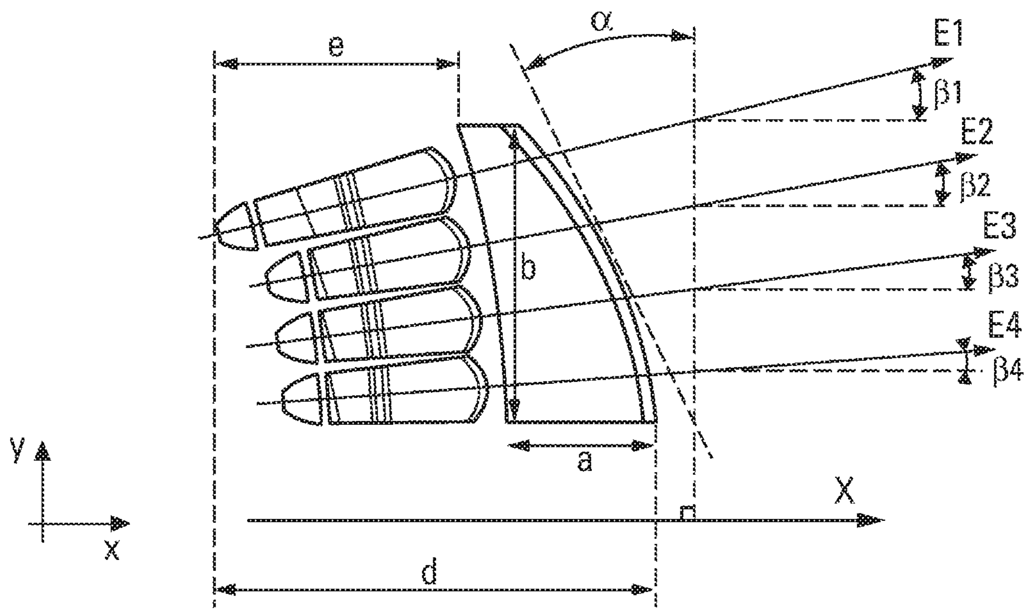
FIG. 6 shows the lighting system of the invention seen from above like FIG. 4.

FIG. 6 corresponds to FIG. 4 with the schematic representation of the dimensions of the devices and of the orientations of the optical axes, the part references not being included for greater legibility.

The general optical axis X of the lighting system is represented under the emission devices 2 and the projection lens 14. It represents the direction of the beams 17 at the output of the lighting system, which are directed to infinity. The optical axes $E_1$ to $E_4$ of the emission devices 2 are inclined relative to the general optical axis X, respectively by an angle $\beta_1$ to $\beta_4$. This inclination can rise to 45° for example, depending on the width of the beam desired at the output of the lighting system.

Similarly, the projection lens 14 is not arranged at right angles to the general optical axis X of the lighting system. In particular, the output surface 16 of the projection lens 14 is inclined by an angle $\alpha$, for example of 14°, relative to the perpendicular to the general optical axis X. This angle $\alpha$ depends on the orientation of the outer lens.

As a function of this angle $\alpha$, the vertical and horizontal powers of the concentration and projection lenses 14 will be adjusted according to the conventional laws of optics.

The thickness a of the projection lens 14 is variable between 2 mm and 40 mm.

Figure 7:
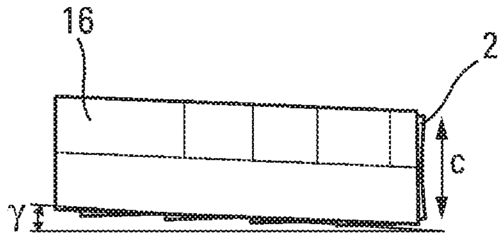
FIG. 7 shows the lighting system of the invention seen from the front.

Its length b is at least as great as the total sum of the widths of the four emission devices 2 so as to cover them and conceal them, as illustrated in FIG. 7 in particular. This length b is preferably of the order of 80 mm.

The length e of the emission devices 2 is preferably between 20 mm and 70 mm. The projection lens 14 can be situated for example at only 20 mm from the output surfaces 8 of the emission devices 2 so as to obtain a lighting system that is as compact as possible.

Advantageously, the form of the output surface of each emission device 2 is adapted to the form of the input surface of the projection lens 14 to limit the optical aberrations and improve the performance levels of the lighting system.

FIG. 7 is a front view of the lighting system, showing the output surface 16 of the projection lens 14 which conceals the emission devices 2.

The inclination γ of the lighting system relative to the horizontal can be 3° for example. It is therefore a minor inclination relative to the horizontal, as was stated at the beginning of the description in the definition of the term “horizontal”.

The height c of the lighting system is, for example, 25 mm, and the overall length d is 130 mm.

Figure 8:
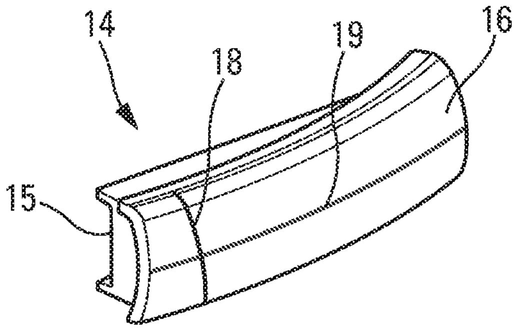
FIGS. 8 and 9 represent the projection lens in perspective, fully mounted.
Figure 9:
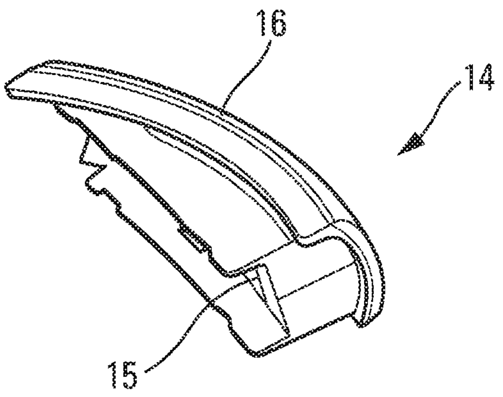

FIGS. 8 and 9 show the projection lens 14 more specifically. In this example, the output surface 16 is concave with a radius preferably of 140 mm.

However, this output surface 16 is above all a style surface, which can take various other forms. Generally, this output surface 16 is formed by a sweep of two radii, namely a vertical radius 18 swept over a horizontal radius 19.

The input 15 and output 16 surfaces of the projection lens 14 are manufactured from transparent thermoplastic polymer, of the polycarbonate (PA) or polymethyl methacrylate (PMMA) type. They can also be manufactured in silicone or in other transparent materials, notably according to the desired refractive index.

Since the output surface 16 constitutes a non-modifiable input parameter given that its objective is to follow the curve of the outer lens, the input surface 15, for its part, is an optical resultant to guarantee the optical Fermat principle. Its form can be convex, concave or even free-form.

The input surface 15 can be produced in several ways, according to the type of projection lens desired. It can be of concave appearance, as can be seen in FIG. 10*a*, if a lens with focal point line 20 is desired. This is the case described in FIG. 4 with the virtual focal point line 18.

It can also be of convex appearance, as can be seen in FIG. 10*b*, if a lens with focal point 21 is desired.

It can also be continuous, as can be seen in FIGS. 3 to 9, or discontinuous as can be seen in FIGS. 11 and 12. In the latter case, the input surface 15 is discretized with four sections 25, 26, 27, 28 linked together. Each section 25, 26, 27, 28 is adapted to the type of light placed upstream. In the example in FIG. 11, the first section 25 and the fourth section 28 are adapted to types of light which deliver a fairly concentrated and intense lighting. The second section 26 and the third section 27 are adapted to types of light which will produce a lighting that is rather minimally intense and spread horizontally. These four types of light operate simultaneously in order to create a low beam. Unlike the high beams described previously, the secondary focal point lines of these four lights are not aligned.

The last FIG. 12 shows an example of integration of such a lighting system in a conventional lighting module with a heat sink 24 and an electronic board 23 powering the various LEDs. A protective housing 22 secured to the outer lens at least partially surrounds the lighting system.

With regard to the above description, the optimum dimensional relationships for the parts of the invention, including the variations of size, of materials, of forms, of function, are considered to be apparent and obvious to those skilled in the art, and all the relationships equivalent to what is illustrated in the drawings and what is described in the document are considered to be included in the present invention.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting system for a motor vehicle comprising:

at least one primary optical emission device for emitting a light beam exhibiting a cutoff profile, the at least one primary optical emission device includes at least one light source and one single-piece primary optical member, the primary optical member includes an input surface configured to receive a light beam emitted by said at least one light source, and an output surface through which all rays of the light beam emitted by the at least one light source travel; and a projection device arranged downstream of and spaced apart from the output surface of the at least one primary optical emission device, the projection device includes an input surface arranged facing the at least one primary optical emission device, and through which are introduced all of the rays of the light beam output from the output surface of the at least one primary optical emission device, wherein an outer surface of the primary optical member includes a hallowed zone forming a relief in cavity form, a longitudinal axis of a peak of the cavity extends transverse to an optical axis X direction of said lighting system, and wherein the peak of the cavity is a focal point and forms a ray interception surface for all rays of the light beam emitted by the at least one light source so as to create the cutoff profile in the light beam.

2. The lighting system according to claim 1, wherein the projection device consists of a projection lens.

3. The lighting system according to claim 2, wherein the lighting system includes at least two primary optical emission devices provided adjacent to each other on a same horizontal plane, each comprising a light source and a primary optical member, and wherein the at least two primary optical emission devices comprise an input portion having the input face and arranged to form a primary image of the at least one light source on the ray interception surface.

4. The lighting system according to claim 3, wherein said at least two primary optical emission devices comprise an output portion having the output surface and arranged to form a secondary image of the primary image, the projection device being arranged to project the secondary image.

5. The lighting system according to claim 4, wherein from the output surface of the projection lens, all the light rays originating from the at least two primary optical emission devices are oriented parallel to one another in a single direction parallel to the optical axis X direction of said lighting system.

6. The lighting system according to claim 1, wherein the input surface of the projection lens is continuous.

7. The lighting system according to claim 6, wherein the at least two primary optical emission devices share a same line of focusing of the light rays on the ray interception surfaces configured to form the cutoff profile.

8. The lighting system according to claim 3, wherein the input surface of the projection lens is discontinuous and is divided into several portions linked to one another, each portion being adapted to and situated downstream of at least one of the at least two primary optical emission devices.

9. The lighting system according to claim 3, wherein the at least two primary optical emission devices and the projection device are formed in a single-piece assembly.

10. A vehicle equipped with at least one lighting system according to claim 2.

11. The lighting system according to claim 3, wherein the at least two primary optical emission devices include an input portion having the input face and arranged to form a primary image of the at least one light source on the ray interception surface.

* * * * *